Jan. 2, 1934.   O. A. ROSS   1,942,186
MOTION PICTURE REEL
Filed April 25, 1930
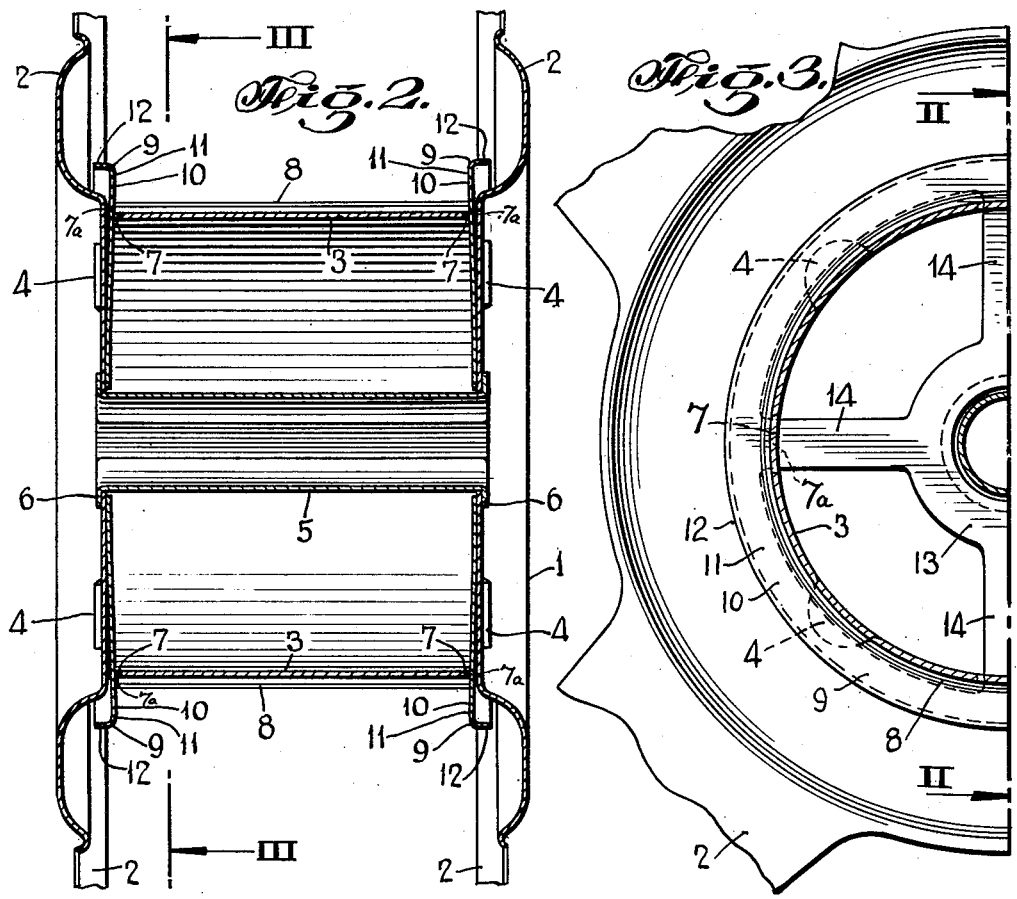
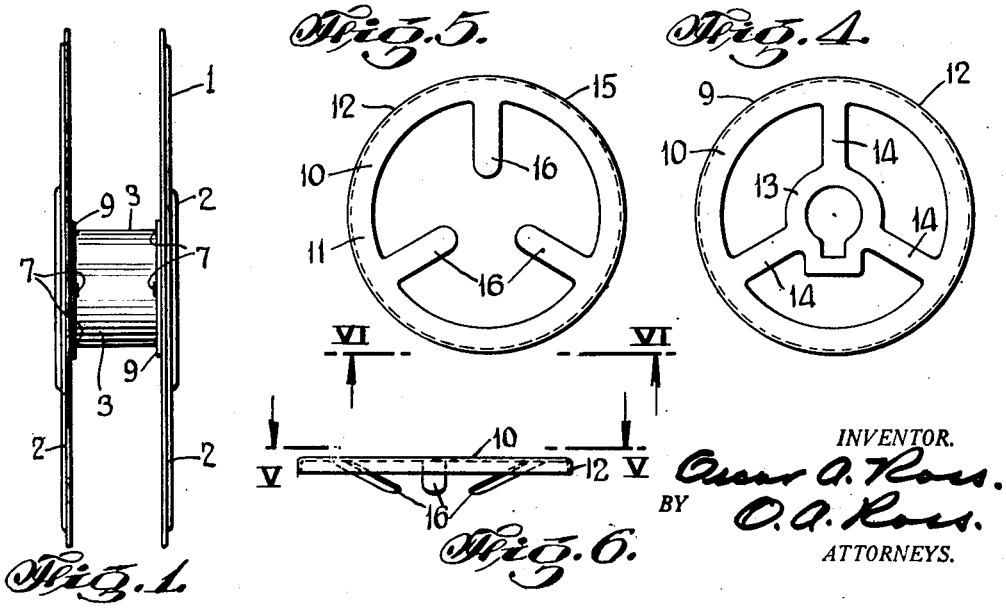
INVENTOR.
Oscar A. Ross.
BY O. A. Ross.
ATTORNEYS.

Patented Jan. 2, 1934

1,942,186

UNITED STATES PATENT OFFICE 1,942,186

MOTION PICTURE REEL

Oscar A. Ross, New York, N. Y.

Application April 25, 1930. Serial No. 447,192

22 Claims. (Cl. 242—74)

This invention refers to reels and more particularly to that class known as motion picture film reels.

One object of this invention is to furnish a more economical and efficient reel for winding motion picture film thereonto.

Another object is to furnish a reel for motion picture films wherein the end of the film may be secured adjacent the hub thereof quickly and without particular skill whereby the film may be more quickly and advantageously wound thereonto.

Another object is to furnish a reel for motion picture films wherein the unwinding of the film therefrom which is usually at high speed, does not produce jerks or sudden displacing of the film as the end adjacent the hub of the reel is unwound, in this manner preventing the tearing or breaking of the film as its end leaves the reel at a high rate of speed.

Another object is to furnish a reel for supporting motion picture film thereon wherein clamping members are arranged to engage the edges of the starting end of the film and in their normal position have an initial tension, said tension also being substantially uniform throughout the range of movement of said clamping members as the film end is inserted therebetween during the winding operation.

Other objects and advantages will appear as the description of the invention progresses and the novel features thereof will be pointed out in the appended claims.

This invention consists in the novel construction and arrangement of parts hereinafter described, delineated in the accompanying drawing and more particularly pointed out in that portion of this instrument wherein patentable novelty is claimed for certain and peculiar features of the invention, it being understood that, within the scope of what hereinafter thus is claimed, divers changes in the form, proportions, size and minor details of the invention may be made without departing from the spirit thereof, or sacrificing any of the details thereof.

In describing the invention in detail, reference is had to the accompanying drawing wherein I have illustrated embodiments of the invention, and wherein like characters of reference designate corresponding parts throughout the several views and in which:—

Figure 1 is an end elevational view of a motion picture film reel to which the applicant's improvement has been applied, and, Fig. 2 is an enlarged sectional view of the same taken on line 2—2 of Fig. 3, and Fig. 3 is also a sectional view of the same taken on line 3—3 of Fig. 2, and, Fig. 4 is a plan view of one form of film clamping member, and Fig. 5 is a similar view of another form of film clamping member taken on line 5—5 of Fig. 6, and, Fig. 6 is a side elevational view of the same taken on line 6—6 of Fig. 5.

Referring to Figs. 2, 3, and 4, reel 1, comprises flanges 2—2 secured to hub 3 by the bent lugs 4—4, the spindle sleeve 5 likewise being secured to said flanges by the bent lugs 6—6.

Hub 3 is formed with recesses or notches as 7—7, the distance between the stop faces 7a—7a of said notches across the face of said hub being less than the width of the film 8. Allocated by said notches are the film clamping members 9—9 having annular clamping portion 10 comprising clamping face 11 and re-enforcing flange 12, also the hub portion 13 connected to said clamping portion by the webs or spokes 14—14, the outer ends of said webs or spokes passing through the notches 7—7. The hub portion 13 is depressed or cupped outwardly with respect to the annular clamping portion 10 and normally impinged against the inner faces of the flanges 2—2 adjacent the spindle sleeve 5, in this manner restraining the outer ends of the webs or spokes 14—14 against the stop faces 7a—7a and whereby the distance across the face of the hub 3 between the faces 11—11 is less than the width of the film 8, therefore as said film is restrained to enter between said surfaces the annular clamping portions 10—10 are restrained outwardly toward the faces of the flanges 2—2 in this manner acting to securely clamp said film by the edges thereof as the film is wound onto the reel 1.

If desired the hub portion 13 of the clamping members 9—9 may be omitted as shown by the clamping member 15 of Figs. 5 and 6, the webs 14—14 being formed into fingers as 16—16, said finger normally having an off-set as shown, the inner ends of said fingers normally impinging upon the inner face of flange 2 and the outer portion thereof normally impinging against the stop faces 7a—7a being restrained thereagainst by the tension of said fingers.

When impinging upon the stop faces 7a—7a, the clamping faces 11—11 are substantially parallel, the restraint of the film therebetween acting to restrain the annular portions uniformly outwardly.

If desired the webs 14—14 or fingers 16—16 may be omitted and a flat or wire spring may be inserted between the annular portions 10—10 and the inner face of the flanges 2—2 and secured thereto, in this manner also omitting the notches 7—7, said springs being likewise secured to said annular portions for the normal allocation thereof.

The clamping members as 9—9 and 15—15 are preferably formed from resilient metal, as steel and thereafter electro-plated in preference to enameling thereby avoiding the possibility of the edges of the film from adhering thereto during long periods between the windings thereof.

What I claim is:—

1. A reel for supporting motion picture film in coiled form thereon comprising, a hub member, flange members secured to each end of the hub member for forming an annular winding space therebetween arranged to receive the film therein, film clamping members having an annular portion thereon surrounding each end of the hub member positioned adjacently inwardly of the flange members, the annular portions being movable relatively to the hub member, oppositely facing film clamping surfaces formed on the annular portions arranged to frictionally uninterruptedly engage the edges of the starting end of the film as it is inserted therebetween, the distance radially of the reel between the inner edge and the periphery of the clamping surfaces being comparatively small as compared to the distance between the periphery of the hub member and the axis thereof whereby only the starting end of the film will be clamped between the annular portions, and means resiliently constraining the annular portions toward one another for effecting frictional engagement with the edge of the film at the starting end thereof is initially wound onto the reel.

2. A reel for supporting motion picture film in coiled form thereon comprising, a hub member, flange members secured to each end thereof for forming an annular winding space therebetween arranged to receive the film therein, film clamping members having an annular portion surrounding each end of the hub member positioned adjacently inwardly of the flange members, the annular portions being movable relatively to the hub member, oppositely facing film clamping surfaces formed on the annular portions arranged to uninterruptedly engage the edges of the film as the starting end thereof is inserted therebetween, means resiliently constraining the annular portions inwardly toward one another, and abutment faces associated with the reel structure arranged to abut the clamping members and arrest the inward movement thereof, the abutment faces being positioned to arrest the inwardly movement of the annular portions at a point whereby the distance between the film clamping surfaces formed thereon will be slightly less than the width of the film when the clamping members are in engagement with the abutment faces.

3. A reel for supporting motion picture film in coiled form thereon comprising, a hub member, flange members secured to each end of the hub member for forming an annular winding space therebetween arranged to receive the film therein, film clamping members having an annular portion thereon surrounding each end of the hub member positioned adjacently inwardly of the flange members, the annular portions being movable relatively to the hub member, oppositely facing film clamping surfaces formed on the annular portions arranged to frictionally uninterruptedly engage the edges of the starting end of the film as it is inserted therebetween, the cubic area of the portion of the annular winding space formed between the oppositely facing film clamping surfaces being comparatively small as compared to the cubic area of the portion thereof formed between the periphery of the film clamping members and the periphery of the flange members whereby the major portion of the film in the annular winding space is positioned remotely from the clamping members, and means resiliently constraining the annular portions toward one another for effecting frictional engagement of the film clamping surfaces with the edges of the film as the starting end thereof is initially inserted onto the reel during the winding thereon.

4. A reel for supporting motion picture film in coiled form thereon comprising, a hub member, flange members secured to each end of the hub member for forming an annular winding space therebetween arranged to receive the film therein, film clamping members having an annular portion surrounding each end of the hub member positioned spacedly inwardly of the flange members whereby an annular free space is formed therebetween, the annular free space being formed uninterruptedly circumferentially between the periphery of the hub member and the periphery of the clamping members, oppositely facing film clamping surfaces formed on the annular portions arranged to frictionally uninterruptedly engage the edges of the starting end of the film as it is inserted therebetween, means resiliently constraining the annular portions toward one another for effecting frictional engagement of the film clamping surfaces with the edges of the starting end of the film as it is inserted onto the reel during the winding operation thereof, and abutment faces associated with the reel structure arranged to abut the clamping members and arrest the inward movement thereof, the abutment faces being arranged to arrest the inward movement of the annular portions at a point whereby the distance between the film clamping surfaces formed thereon will be slightly less than the width of the film when the clamping members are in engagement with the abutment surfaces.

5. A reel for supporting motion picture film in coiled form thereon comprising, a hub member, flange members secured to each end of the hub member for forming an annular winding space therebetween arranged to receive the film therein, film clamping members having an annular portion thereon surrounding each end of the hub member positioned adjacently inwardly of the flange members, the annular portions being movable relatively to the hub member, oppositely facing film clamping surfaces formed on the annular portions arranged to frictionally uninterruptedly engage the edges of the starting end of the film as it is inserted therebetween, the portion of the annular winding space formed between the oppositely facing film clamping surfaces having a cubic area less than the cubic area of the portion thereof formed between the periphery of the clamping members and the periphery of the flange members, the portion formed between the periphery of the clamping members and the periphery of the flange members being formed uninterruptedly circumferentially between the inner walls of the flange members, and means resiliently constraining the annular portions toward one another for effecting frictional engagement of the film clamping surfaces with the edges of the film as the starting end thereof is initially wound onto the reel during the winding operation thereof.

6. A motion picture reel for supporting a band of film thereon in coiled form comprising, a hub member having flange members secured at each end thereof, film clamping members arranged at each end of the hub member having one portion thereof positioned exteriorly of the hub member and another portion positioned interiorly of the member, the portion of the clamping members positioned exteriorly of the hub member being allocated spacedly from the inner face of the flange members and restrained to move away therefrom, and the interiorly positioned portion of the clamping members having engagement with the flange members, the engagement thereof acting to constrain the exterior portion of the clamping members away from the inner face of the flange members whereby the film band may be clamped therebetween by the edges thereof.

7. A reel for supporting motion picture film in coiled form thereon comprising, a hub member, flange members secured to each end thereof for forming an annular winding space therebetween arranged to receive the film therein, film clamping means positioned at one end of the hub member inwardly of the flange member secured thereto, a film clamping member having an annular portion surrounding the hub member positioned at the other end thereof inwardly of the flange member secured thereto, the annular portion being movable relatively to the hub member, a film clamping surface formed on the annular portion facing inwardly of the winding space toward the film clamping means, means resiliently constraining the annular portion inwardly of the winding space toward the film clamping means whereby the edges of the film will be frictionally uninterruptedly clamped between the film clamping surface and the film clamping means as the starting end thereof is inserted therebetween, the distance radially of the reel between the inner edge and the periphery of the annular portion being comparatively small as compared to the distance between the periphery of the hub member and the axis thereof whereby only the edges of the starting end of the film will be clamped between the clamping surface and the clamping means as the film is wound onto the reel.

8. A reel for supporting motion picture film in coiled form thereon comprising, a hub member, flange members secured to each end thereof for forming an annular winding space arranged to receive the film therein, film clamping means positioned at one end of the hub member adjacently inwardly of the flange member secured thereto, a film clamping member having an annular portion formed thereon surrounding the other end of the hub member adjacently inwardly of the flange member secured thereto, the annular portion being movable relatively to the hub member, a film clamping surface formed on the annular portion facing inwardly of the winding space toward the film clamping means, means resiliently constraining the annular portion inwardly of the winding space toward the film clamping means whereby the edges of the film will be frictionally uninterruptedly clamped between the film clamping surface and the film clamping means as the starting end thereof is inserted therebetween, the cubic area of the portion of the annular winding space formed between the periphery of the hub member and the periphery of the clamping member being com- paratively small as compared to the cubic area of the portion thereof formed between the periphery of the clamping member and the periphery of the flange members whereby the major portion of the coiled film in the annular winding space will be positioned remotely from the clamping member radially of the reel structure.

9. A sheet metal film clamping member for motion picture reels comprising, a reenforced annular outer portion having a film clamping surface formed on one face thereof, and a plurality of circumferentially spaced resilient portions integrally joined thereto, the resilient portions extending radially inwardly of the opening in the annular portion.

10. A sheet metal film clamping member for motion picture reels comprising, a comparatively thin annular outer portion having a film clamping surface formed on one face thereof, and a plurality of circumferentially spaced resilient portions integrally joined thereto, the resilient portions extending radially inwardly of the opening in the annular portion.

11. A sheet metal film clamping member for motion picture reels comprising, an annular outer portion having a film clamping surface formed thereon, and a plurality of circumferentially spaced inwardly extending resilient portions integrally joined thereto, the inner ends of the resilient portions being integrally joined by another annular portion positioned spacedly inwardly of the outer annular portion.

12. A sheet metal film clamping member for motion picture reels comprising, a comparatively thin outer annular portion having a film clamping surface formed on one face thereof, and a plurality of circumferentially spaced elongated resilient portions joined to the inner edge of the annular portion, the resilient portions being angularly disposed inwardly of the face bearing the film clamping surface.

13. A sheet metal film clamping member for motion picture reels comprising, a comparatively thin annular outer portion having a film clamping surface formed on one face thereof, a plurality of circumferentially spaced inwardly extending elongated resilient portions integrally joined to the annular outer portion, and an inner annular portion integrally joining the inner ends of the resilient portions.

14. A sheet metal film clamping member for motion picture film reels comprising, a comparatively thin outer annular portion having a film clamping surface formed on one face thereof, a reenforcing portion integrally joined to the peripheral edge of the annular portion, and a plurality of circumferentially spaced elongated resilient portions integrally joined to the inner edge of the annular portion.

15. A sheet metal film clamping member for motion picture reels comprising, a reenforced annular outer portion having a film clamping surface formed thereon, and a plurality of circumferentially spaced elongated resilient portions extending radially inwardly therefrom, the resilient portions being integrally joined to the annular portion.

16. A sheet metal film clamping member for motion picture film reels comprising, an annular outer portion having a film clamping surface formed on one face thereof, the distance radially across the end faces of the annular portion being comparatively small as compared to the radius of the opening through the annular portion, and elongated resilient portions resilient portions extending radially inwardly from the annular portion, the resilient portions being spaced circumferentially thereof and integrally joined thereto.

17. A sheet metal film clamping member for motion picture film reels comprising, a comparatively thin annular outer portion having a film clamping surface formed on one face thereof, a reenforced flange portion formed at the outer edge of the annular portion, the flange portion extending angularly rearwardly from the face bearing the film clamping surface, and a plurality of circumferentially spaced inwardly extending resilient portions joined to the inner edge of the annular portion.

18. A reel for supporting motion picture film in coiled form thereon comprising, a chambered hub member, flange members secured to each end thereof for forming an annular winding space therebetween arranged to receive the film therein, film clamping members positioned at each end of the hub member inwardly of the flange members, rigid clamping portions formed thereon positioned exteriorly of the hub member spacedly inwardly of the flange members and movable relatively thereto, resilient portions formed on the clamping members joined to the rigid portions thereof, the resilient portions being positioned within the hub chamber and arranged to constrain movement of the rigid portions inwardly toward one another, and oppositely facing film clamping surfaces formed on the rigid clamping portions arranged to frictionally engage the edges of the film as the starting end thereof is inserted therebetween.

19. A reel for supporting motion picture film in coiled form thereon comprising, a chambered hub member, flange members secured to each end thereof for forming an annular winding space therebetween arranged to receive the film therein, film clamping members positioned at each end of the hub member inwardly of the flange members, reenforced clamping portions formed thereon positioned exteriorly of the hub member spacedly inwardly of the flange members and movable relatively thereto, resilient portions formed on the clamping members joined to the reenforced portions thereof, the resilient portions extending inwardly into the hub chamber, and oppositely facing film clamping surfaces formed on the reenforced portions arranged to frictionally engage the edges of the film as the starting end is inserted there 20. A reel for supporting motion picture film in coiled form thereon comprising, a chambered hub member, flange members secured to each end thereof for forming an annular winding space therebetween arranged to receive the film therein, film clamping members positioned at each end of the hub member inwardly of the flange members, recesses formed inwardly of each end of the hub member, certain portion of the clamping members being positioned exteriorly of the hub member for clamping the film edges therebetween and other portions being positioned within the hub member chamber, the exterior and interior portions being joined through the recesses.

21. A reel for supporting motion picture film in coiled form thereon comprising, a chambered hub member, flange members secured to each end thereof for forming an annular winding space therebetween arranged to receive the film therein, film clamping members positioned at each end of the hub member inwardly of the flange members, recesses formed inwardly of each end of the hub member, certain portions of the clamping members being positioned exteriorly of the hub member for clamping the film edges therebetween and other portions thereof being positioned within the hub member chamber and arranged to constrain the exterior portions toward one another, the exterior and interior portions being joined through the recesses of the hub member.

22. A motion picture reel for supporting a band of film in coiled form thereon comprising, a hub member having flange members secured to each end thereof whereby an annular space is formed therebetween arranged to receive the film, film clamping members arranged at each end of the hub member having one portion thereof positioned exteriorly of the hub member and another portion thereof positioned interiorly thereof, the portion positioned exteriorly of the hub member being allocated spacedly inwardly of the inner face of the flange member adjacent thereto and movable relatively therewith and means associated with the portion positioned interiorly of the hub member for yieldingly constraining the portions exteriorly of the hub member inwardly one toward the other whereby the edges of the film may be frictionally clamped therebetween.

OSCAR A. ROSS.